July 16, 1957 W. V. SPURLIN 2,799,383
VIBRATORY FEEDER BOWL HAVING AN INWARDLY
SLOPING TRACK WITH AN OVERHANGING FENCE
Filed Nov. 13, 1953 2 Sheets-Sheet 1

INVENTOR.
WILLIAM V. SPURLIN
BY
HIS ATTORNEY

July 16, 1957   W. V. SPURLIN   2,799,383
VIBRATORY FEEDER BOWL HAVING AN INWARDLY
SLOPING TRACK WITH AN OVERHANGING FENCE
Filed Nov. 13, 1953   2 Sheets-Sheet 2

INVENTOR.
WILLIAM V. SPURLIN

BY
HIS ATTORNEY 2,799,383
Patented July 16, 1957

United States Patent Office

2,799,383

VIBRATORY FEEDER BOWL HAVING AN INWARDLY SLOPING TRACK WITH AN OVERHANGING FENCE

William V. Spurlin, Indiana, Pa., assignor to Syntron Company, Homer City, Pa., a corporation of Delaware Application November 13, 1953, Serial No. 391,888

8 Claims. (Cl. 198—33)

This invention relates generally to material handling devices such as conveyor feeder bowls and more particularly to an article handling device wherein the articles are fed along a track supported by the bowl and are oriented in a predetermined position for delivery, which position may be other than the manner in which the article is conveyed along the track.

When assembling parts in production or handling parts for similar jobs it is frequently desirable to supply one or more series of articles to a common work station. Each article is fed in turn and oriented to a definite or predetermined position owing to the actual shape of the article. However, the article itself is frequently not adapted for conveying in the manner in which it is desired to be delivered for use in the manufacturing step or assembly program. In such instances it is preferable to employ an article feeding bowl for holding a quantity of articles which are picked up and conveyed along the helical conveyor track in a manner which is most suitable to efficiently convey that particular article, and before the article is to be delivered from the bowl for use it is oriented by a special section track or by projections or abutments arranged to position the articles so they will be readily adaptable for use when delivered from the bowl.

Each of these feeder bowls is mounted on a frame that is supported for vibratory reciprocation as a free body in an inclined path that is arcuate relative to a vertical central axis. These flexible members permit this reciprocatory movement and they may be constructed from elastomer members, metal springs or torsion bars. These flexible members are in turn mounted on a base that is massive relative to the mass of the frame including the loaded bowl. This base is supported on resilient pads or feet as it must vibrate but not as violently as the lighter mass of the frame and bowl that must feed the articles along the track.

The vibrating mass of the frame, bowl and load it carries has to be tuned to reciprocate within a few cycles more or less of the frequency of the driving impulses so that the tuned mass will synchronize with driving impulses. These impulses may be obtained mechanically or electromagnetically. The direction of the force of the impulse may be axial, tangential or along the path of reciprocation. They must be balanced relative to the central axis around which the bowl and frame reciprocate in their inclined arcuate path of movement.

The feeder bowl comprising this invention provides an inwardly sloping track before discharge which requires a fence to support the parts as they are being conveyed therealong. The fence may be supported from above and spaced from the track to provide selection of the parts as to orientation and also to present the parts in a predetermined orientation to pass to discharge. Another part of the fence may rise up from the inner edge of the track to hold the parts on the track when the upper part of the fence is absent. One or both fences may be employed independently or in combination to perform the proper orientation or selection of the part being fed from the bowl.

In the structures specifically employed to illustrate this invention, one bowl is for the purpose of feeding a zipper pull tab having a lock protrusion and this protrusion is engaged by the fence to hold the part on the track as it is delivered from the bowl. Thus the fence is overhanging and not touching the track. This permits the vibration to lift the part and jostle it so that it can slide down through the opening between the track and the overhanging fence and thus be properly oriented and fed along laterally of their longitudinal axis.

The other structure employed to illustrate this invention is for feeding small screws in which it is desired that they be fed traveling on their heads with their stems extending vertically. Screws lying down in any manner are rejected. This is accomplished by having a track that slopes toward the bowl and has a fence extending up from the inner edge of the track. This fence holds all the screws from rolling or vibrating off back into the bowl. A gap is placed in the fence and an upper fence is supported in spaced relation to the track. The spacing of this fence is sufficiently high to hold those screws whose stems are projecting upwardly but all other screws that are lying down are vibrated off through the gap in the lower fence back into the bowl.

Thus by the use of overhanging fences and upwardly extending fences of their combination, a selection of different parts may be made. If the fence on an inwardly sloping track is very low it may be used to select washers. Any washers piled on one another will slide off as the fence is too short. Thus only a single line of washers will be fed to discharge.

Other objects and advantages appear hereinafter in the following description and claims.

The accompanying drawings show for the purpose of exemplification without limiting the invention or claims thereto, certain practical embodiments illustrating the principles of the invention wherein:

Figure 1:
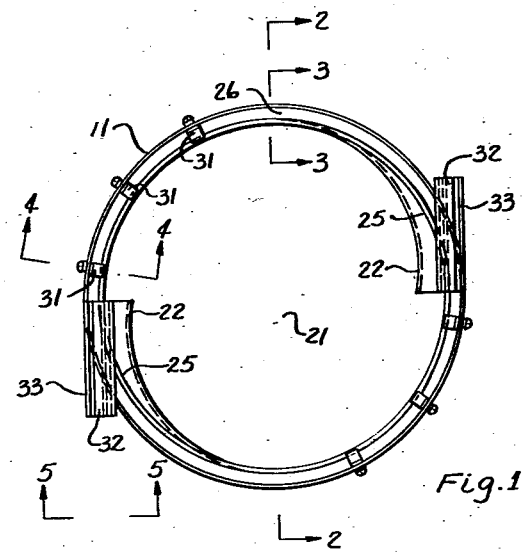
Fig. 1 is a plan view of a bowl feeder having an extended overhanging fence.
Figure 2:
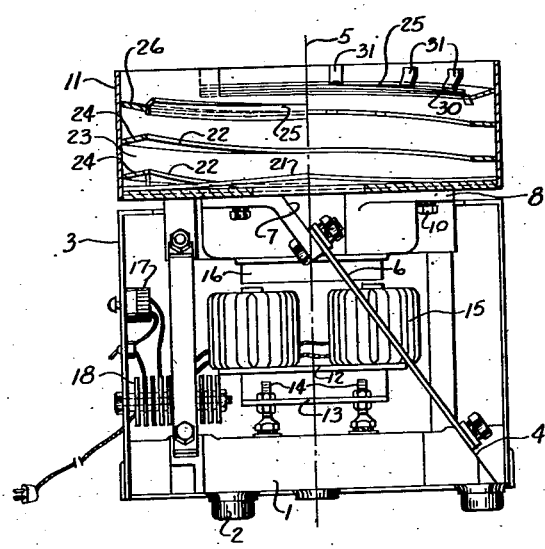
Fig. 2 is a view in vertical section of the structure shown in Fig. 1.
Figure 3:
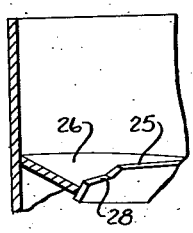
Fig. 3 is a detailed sectional view taken on the line 3—3 of Fig. 1.

Referring to the drawings, the reciprocating vibratory motor comprises the massive base 1 which is preferably a casting supported by the resilient feet 2 and carries the outer casing 3 that encloses the motor and the control parts therefor.

The base 1 is provided with a plurality of sloping seats 4 uniformly disposed about the vertical central axis indicated by the construction line 5. As shown these seats support the lower ends of the tuned spring means such as the leaf spring means 6. The upper ends of these leaf springs are secured to corresponding seats 7 formed on the frame 8. This frame member is provided with openings to receive the mounting bolts 10 for securing the bowl 11 to the frame.

The motor illustrated is of the electromagnetic type and comprises the core member 12 mounted on the bracket 13 that is adjustably supported on the top of the base 1 by the mounting bolts 14. The core is in the shape of an E and has a coil 15 on the center post. The armature 16 is secured to the underside of the frame 8 and extends over each of the pole faces of the core member 12. By properly mounting the core 12 and the armature 16 relative to the central axis 5 each energy impulse of the motor produces a downward axial pull, causing the springs 6 to flex and move the frame in an inclined arcuate path of movement. When the energy impulse passes the springs permit the frame to raise to its normal position.

By tuning the springs 6 to reciprocate the frame at a frequency of a few cycles more or less than the frequency of the driving energy impulses, the vibratory system will follow in synchronism with the frequency of the energy impulses and the best operation of this reciprocating vibratory device will be obtained.

If the armature is made of permanent magnet material the frame will reciprocate in synchronism with the energy impulses which would be any suitable source of alternating current. If the armature is made of laminate steel the field would reciprocate at a rate equal to twice the frequency of the alternating current as each cycle has two current impulses. The springs 6 should of course be tuned to within a few cycles of the frequency that the device is to reciprocate. A half wave rectifier such as shown at 17 can be employed to reduce the number of current impulses to that of the frequency which then causes the armature and the parts attached thereto to reciprocate.

The magnitude of the current impulses may be controlled by a simple rheostat as shown at 18. The coil 15, the half wave rectifier 17, and rheostat 18 are connected in series across a source of alternating current.

Referring to Figs. 1 to 5 inclusive, the feeder bowl 11 is of the fabricated type having the conical base 21 and the dual helical track 22 each of which is the same and start and end at 180° from each other. As the track mounts the annular wall 23 it slopes slightly toward the wall as shown at 24. When the track approaches the top it becomes horizontal and receives the upwardly extending fence 25 along its inner edge. The track then begins to slope toward the bowl as indicated at 26. The fence thus holds the articles 27 on the track and permits them to move forward toward discharge. Since the articles are longer than they are wide the vibration causes them to lie against the fence with their longitudinal axis in the direction of their travel.

The top of the fence 25 is cut away as shown at 28 for some distance and those parts which do not have their projections extending upwardly will fall off back into the bowl. The pieces properly oriented will remain on the track in engagement with the wall.

Figure 5:
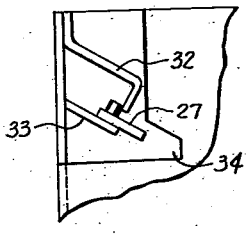
Fig. 5 is a detailed view taken on the line 5—5 of Fig. 1.
Figure 4:
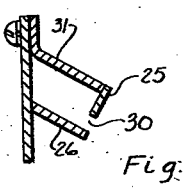
Fig. 4 is a detailed sectional view taken on the line 4—4 of Fig. 1.
Figure 6:
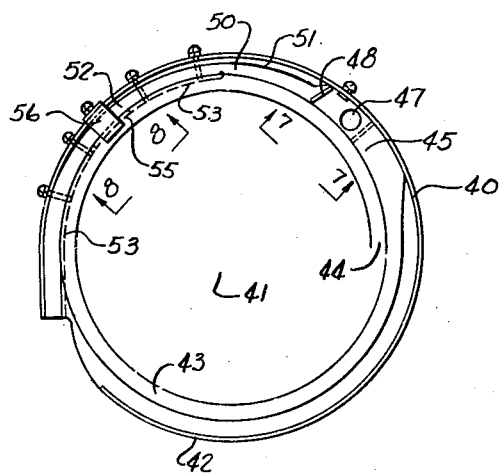
Fig. 6 is a plan view of a bowl feeder for screws.
Figure 7:
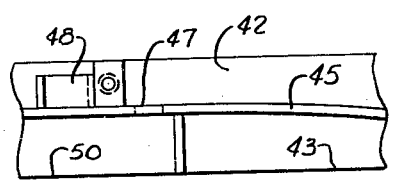
Fig. 7 is a detailed view in elevation taken on the line 7—7 of Fig. 6.
Figure 8:
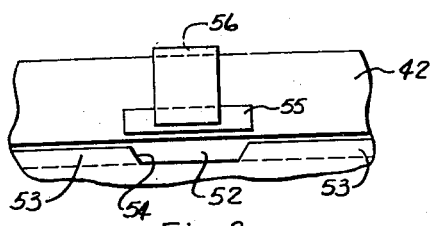
Fig. 8 is a detailed view in elevation taken on the line 8—8 of Fig. 6.
Figure 9:
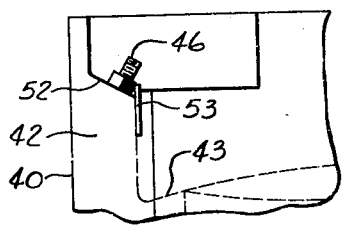
Fig. 9 is a partial view in elevation of the bowl feeder of Fig. 6.

The lower part of the fence 25 is then removed to form the opening 30 which extends for a considerable distance along the track to allow the tail of the parts 27 to swing out over the bowl being held by the small projection engaging the fence 25 which is supported by the spaced brackets 31. The three brackets 31 stiffen the fence above the opening 30 and prevent it from vibrating too freely. Where the track passes through the rim of the bowl a continuous bracket 32 is formed integral with the angle 33 that forms the track to carry the tab 27 to discharge as shown in Fig. 5. In order to pass through the bowl wall 20 the same is provided with the opening 34.

Thus the tab 27 having a projection can readily be properly oriented and fed when suspended by the projection held by an overhanging fence. This part could not be slid along such a track. It takes vibratory action which lifts the part from the track to propel it along the track.

In Figs. 6 to 9 inclusive, the feeder bowl 40 is a cast bowl with the conical bottom 41 and the wall 42 having the spiral track 43 on its inner surface. The spiral track starts at 44 and winds spirally until it passes through the wall at discharge. The initial part of the track slopes in the manner of the bottom 41 that is downwardly toward the wall. Before the track reaches discharge it is provided with a sharp inclined portion riser 45 that extends up over a section of track 50. The parts being conveyed are the machine screws 46 and it is desired that they be fed riding on their heads. These screws travel up the riser and drop through the hole 47 to the track section 50. If they do not drop through the hole the guide plate 48 either causes them to circulate back to the hole 47 or back into the bowl and down on the lower track section. Those machine screws which do drop through the hole usually drop head first and stay on their heads on the track section 50 and continue to discharge. The track section 50 starts substantially horizontal and in each integrated part up the spiral track a feather edge guide 51 extends along the wall and urges the screw parts 46 to the inside edge of the track 50. The track 50 subsequently changes and slopes to the center of the bowl as indicated at 52 and requires the fence 53 which is set into the track and extends therealong. The fence is notched out as shown at 54 in Fig. 8 and any machine screws 46 which are not riding along on their heads will roll off the sloping track and back into the bowl. Those screws 46 that are standing on their heads will continue to be fed along the sloping track 52 and while passing the gap 54 in the fence their screw stems engage the overhanging fence 55 supported from the bowl wall by the bracket 56. Thus the improperly arranged screws will drop away and the properly oriented screws will be fed to discharge.

I claim:

1. An article handling feeder bowl for delivering in turn a series of articles which comprises a feeder bowl having a bottom with an upstanding annular wall, motor means to support and effect a vibratory reciprocation of the bowl and each part attached thereto along an arcuate path of movement, an inclined conveyer track means extending from the bottom of the bowl upwardly around the inside annular wall to discharge, a section of said track sloped toward the center of the bowl, and an overhanging article selecting fence supported by the bowl and extending along the inner edge of said track and spaced thereabove to retain only properly oriented articles vibrated in a positive conveying action by their engagement with the track means and fence.

2. The structure of claim 1 which also includes a fence structure extending up from the inner edge of said track adjacent the end of said overhanging fence.

3. The structure of claim 2 characterized in that both fence structures are an integral part of each other forming one continuous fence.

4. The structure of claim 2 characterized in that one portion of the upwardly extending fence is lower than another portion thereof to allow improperly oriented parts to fall back into the bowl.

5. The structure of claim 1 characterized in that said inwardly sloping track and said overhanging fence extends to discharge.

6. The structure of claim 2 which also includes a riser forming an upper track to convey the articles thereabove, means defining a hole in said upper track through which some articles drop to the first track to orient the same, and a guide to direct those articles off the upper track that do not make the hole.

7. The structure of claim 1 characterized in that said overhanging fence extends for a short distance and a second fence extending up from the inner edge of said track on each side of said overhanging fence.

8. The structure of claim 7 characterized in that said second fence is one continuous piece with a cutout below said overhanging fence.

References Cited in the file of this patent
UNITED STATES PATENTS

| | | |
|---|---|---|
| 326,153 | Richards | Sept. 15, 1885 |
| 2,609,914 | Balsiger | Sept. 9, 1952 |
| 2,725,971 | Clark-Riede | Dec. 6, 1955 |